United States Patent
Mayumi

(10) Patent No.: US 7,009,368 B2
(45) Date of Patent: Mar. 7, 2006

(54) VOLTAGE BOOSTER CIRCUIT HAVING BACK-UP CIRCUIT AND BATTERY VOLTAGE BOOSTING METHOD

(75) Inventor: Nobuo Mayumi, Toyohashi (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/019,260

(22) Filed: Dec. 23, 2004

(65) Prior Publication Data
US 2005/0179424 A1    Aug. 18, 2005

(30) Foreign Application Priority Data
Feb. 12, 2004 (JP) .............................. 2004-035519

(51) Int. Cl.
*G05F 1/10* (2006.01)
(52) U.S. Cl. ..................................... 323/222; 323/283
(58) Field of Classification Search ................ 323/222, 323/282, 283, 285, 351; 363/59, 60
See application file for complete search history.

(56) References Cited

U.S. PATENT DOCUMENTS

| | | | | |
|---|---|---|---|---|
| 5,220,901 | A * | 6/1993 | Morita et al. ................ | 123/604 |
| 5,233,287 | A * | 8/1993 | Lenk ........................... | 323/268 |
| 5,737,204 | A * | 4/1998 | Brown ......................... | 363/89 |
| 6,011,707 | A * | 1/2000 | Mine ............................ | 363/89 |
| 6,198,258 | B1 * | 3/2001 | Ando et al. .................. | 323/222 |
| 6,222,746 | B1 * | 4/2001 | Kim ............................. | 363/89 |
| 6,844,739 | B1 * | 1/2005 | Kasai et al. ................. | 324/611 |

FOREIGN PATENT DOCUMENTS

JP    A-2001-178118    6/2001

OTHER PUBLICATIONS

"DC-to-DC Converter Control Circuits—Semiconductor Technical Data" MC34063A, MC33063A, *Motorola Analog IC Device Data*, Motorola, Inc., 1996 pp. 1-12.

* cited by examiner

*Primary Examiner*—Adolf Berhane
(74) *Attorney, Agent, or Firm*—Posz Law Group, PLC

(57) ABSTRACT

In a voltage booster circuit, a switching transistor turns on and off a flow of an electric current in a booster coil thereby to boost a voltage supplied form a d.c. power source. A back-up circuit is connected to the booster coil to store the boosted voltage as an output voltage. A current detection circuit detects an electric current flowing in the switching transistor and turns off the switching transistor, when the detected current reaches a predetermined level. An off-period control circuit variably controls an off-period of the switching transistor after the switching transistor is turned off. The off-period control circuit varies the off-period in accordance with a voltage difference between the output voltage and an upper limit threshold voltage. The off-period of the switching transistor is increased as the output voltage increases toward the upper limit threshold voltage

10 Claims, 3 Drawing Sheets

VOLTAGE BOOSTER CIRCUIT HAVING BACK-UP CIRCUIT AND BATTERY VOLTAGE BOOSTING METHOD

CROSS REFERENCE TO RELATED APPLICATION

This application is based on and incorporates herein by reference Japanese Patent Application No. 2004-35519 filed on Feb. 12, 2004.

FIELD OF THE INVENTION

The present invention relates to a voltage booster circuit and a voltage boosting method, which boosts a d.c. power source voltage and has a back-up function, and a passenger protection system including the voltage booster circuit and mounted on a vehicle.

BACKGROUND OF THE INVENTION

In recent vehicles a passenger protection system such as an airbag or a seat belt pretensioner is used. In case of the airbag system, an inflator is activated to inflate an airbag when an acceleration sensor detects a vehicle collision. Since the voltage of a storage battery of the vehicle is not sufficient to activate the inflator by its associated circuits and devices, a voltage booster circuit is used to supply a higher voltage to the circuits and devices. The voltage booster circuit is typically a DC-DC converter, which boosts a battery voltage, and has a back-up circuit to supply sufficient electric power to activate the inflator even when the electric connection with the battery is disconnected due to a collision.

JP 2001-178118A discloses one exemplary airbag system. In this system, a DC-DC converter circuit has a switching transistor, a booster coil and the like. The switching transistor is turned on and off at a fixed frequency, specifically with a fixed on-period and a fixed off-period, to boost a battery voltage and store the boosted voltage in a capacitor of the back-up circuit. This DC-DC converter circuit, however, needs a long time to charge the capacitor. Further, the fixed frequency to turn on and off the switching transistor is set to about several tens of kHz to several hundreds of kHz to ensure switching operation of the switching transistor even under a low battery voltage condition. This switching operation of the transistor at the high frequency tends to generate noises.

SUMMARY OF THE INVENTION

It is therefore an object of the present invention to provide a voltage booster circuit and a passenger protection system using the voltage booster circuit, which quickly charges a back-up circuit and generates less noises when a switching transistor for a voltage boosting operation turns on and off.

It is another object of the present invention to provide a voltage boosting method.

According to the present invention, a switching transistor turns on and off a flow of an electric current in a booster coil thereby to boost a voltage supplied form a d.c. power source. A back-up circuit is connected to the booster coil to store the boosted voltage as an output voltage. A current detection circuit detects an electric current flowing in the switching transistor and turns off the switching transistor, when the detected current reaches a predetermined level. An off-period control circuit variably controls an off-period of the switching transistor after the switching transistor is turned off. The off-period control circuit varies the off-period in accordance with a voltage difference between the output voltage and an upper limit threshold voltage. The off-period of the switching transistor is increased as the output voltage increases toward the upper limit threshold voltage.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
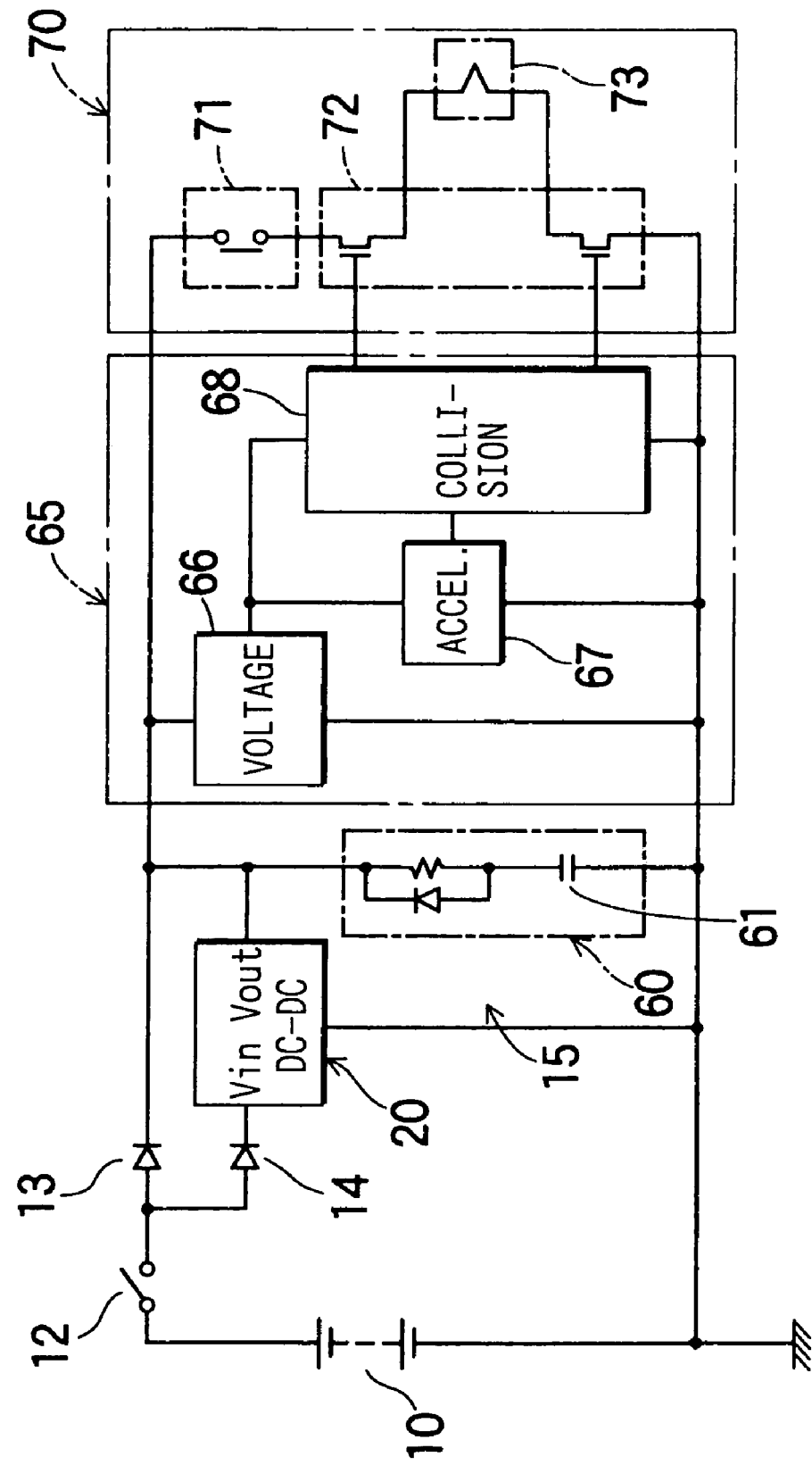
FIG. 1 is a block diagram of a passenger protection system according to an embodiment of the present invention.

Referring first to FIG. 1, a passenger protection system is constructed as an airbag system and comprises a d.c. storage battery 10, an ignition switch 12, a DC-DC converter circuit 20, a back-up circuit 60, a collision determination unit 65 and a passenger protection unit 70.

The DC-DC converter circuit 20 is connected to the battery through a diode 14 to boost a voltage of the battery 10. The back-up circuit 60 includes a back-up capacitor 61, and connected to both the battery 10 through a diode 13 and the output terminal of the DC-DC converter circuit 20. The back-up circuit 60 supplies an electric power to the collision determination unit 65 and the passenger protection unit 70 in place of the battery 10, when the battery 10 is disconnected from the above circuits and units 20, 60, 65 and 70. The diodes 13 and 14 are for restricting electric currents from flowing in reverse.

The collision determination unit 65 includes a constant voltage power circuit 66, an acceleration sensor 67 and a collision determination circuit 68. The acceleration sensor 68 is held operative with the constant voltage from the power circuit 66 and detects an acceleration (deceleration) applied to a vehicle. The determination circuit 67 determines a collision of the vehicle in response to the detected acceleration.

The passenger protection unit 70 includes a safety sensor 71, an igniter drive circuit 72, a squib 73 and an airbag (not shown). The igniter drive circuit 72 turns on to activate the squib 73 to inflate the airbag in response to an output signal from the collision determination circuit 68 indicative of a vehicle collision.

Figure 2:
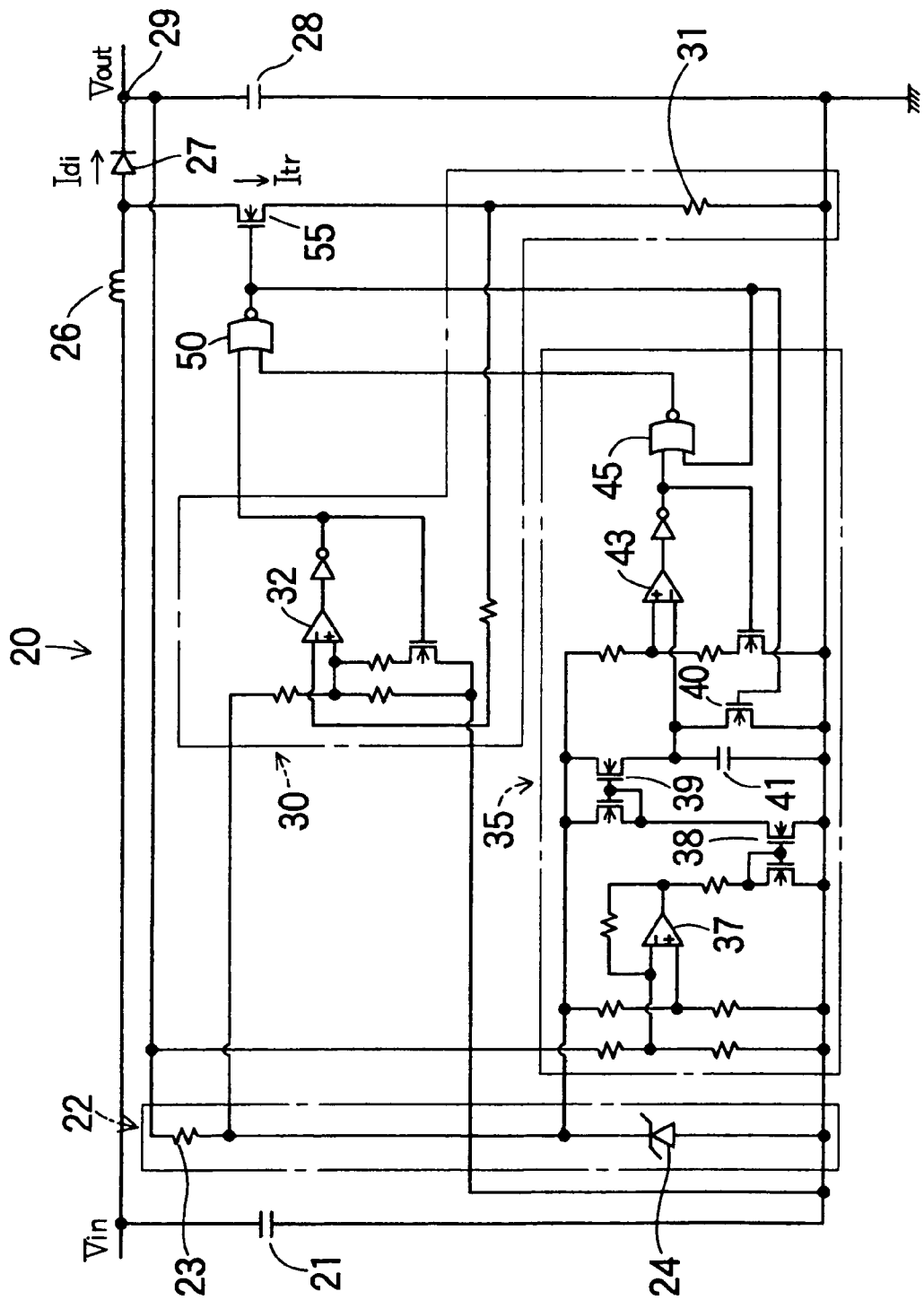
FIG. 2 is a detailed circuit diagram of a DC-DC converter circuit according to the embodiment.

The DC-DC converter circuit 20 includes, as shown in FIG. 2, an input smoothing capacitor 21, a reference voltage circuit 22, a voltage booster coil 26, a diode 27, an output smoothing capacitor 28, a current detection circuit 30, a off-timer variable control circuit 35, a drive circuit 50, a voltage booster switching transistor 55 and the like.

The drive circuit 50 is a NOR gate for controlling the switching transistor 55. It receives the output signals of the current detection circuit 30 and the off-timer variable control circuit 35. The NOR gate produces a low level signal ("0") and a high level signal ("1"), when at least either input is at the high level and when both inputs are at the low level, respectively. The switching transistor 55 turns on and off in response to the high level signal and the low level signal applied from the drive circuit 50, respectively.

The reference voltage circuit 22 includes a resistor 23 and a Zener diode 24, and provides a voltage with the output voltage Vout of the DC-DC converter circuit 20. The coil 26 stores therein electric energy supplied from the battery 10. The transistor 55 is turned on and off by the driver circuit 50 to charge the capacitor 61 in the back-up circuit 60 with the energy stored in the coil 26 through the diode 27.

The current detection circuit 30 is for determining the time point to turn off the switching transistor 55. It includes a shunt resistor 31, a comparator 32 and the like. The comparator 32 receives a first reference voltage and a detection voltage from the shunt resistor 31. The shunt resistor 31 is connected in series with the switching transistor 55, and hence the detection voltage corresponds to a current Itr flowing in the switching transistor 55. The comparator 32 compares those two input voltages and produces a low level signal ("0") each time the current Itr reaches a predetermined threshold current level Ith. This low level signal is inverted and then applied to the drive circuit 50 thereby to turn off the switching transistor 55.

The off-timer variable control circuit 35 is for controlling the off-period of the switching transistor 55, that is, the time point to turn on the switching transistor 55, variably with a voltage difference between a second reference voltage and the output voltage Vout of the DC-DC converter circuit 20 produced at the output terminal 29. The control circuit 35 includes an operational amplifier 37, a pair of current mirror circuits 38, 39, a transistor 40, a capacitor 41, a comparator 43, a NOR gate 45 and the like.

The operational amplifier 37 amplifies the voltage difference between the two input voltages of the control circuit 35. The current mirror circuits 38 and 39 convert a voltage indicative of the input voltage difference to a current, which charges the capacitor 41. As the input voltage difference increases, the charging current for the capacitor 41 also increases. Therefore, the voltage across the capacitor 40 applied to the comparator 43 increases with an increase in the input voltage difference of the amplifier 37.

The comparator 43 compares the output voltage of the capacitor 41 and a third reference voltage. The comparator 43 produces a low level signal ("0"). This low level signal is inverted and applied to the NOR gate 45. The NOR gate 45 responsively produces a low level signal. Since the NOR gate 45 is connected to the drive circuit 50, the drive circuit 50 produces a high level signal ("1"). With this high level signal, the switching transistor 55 turns on. At the same time, that is, at the start of the on-period of the switching transistor 55, the transistor 40 turns on and discharges the capacitor 41. Thus, the off-period of the switching transistor 55 is controlled to a shorter period as the input voltage difference of the control circuit 35 increases.

Figure 3:
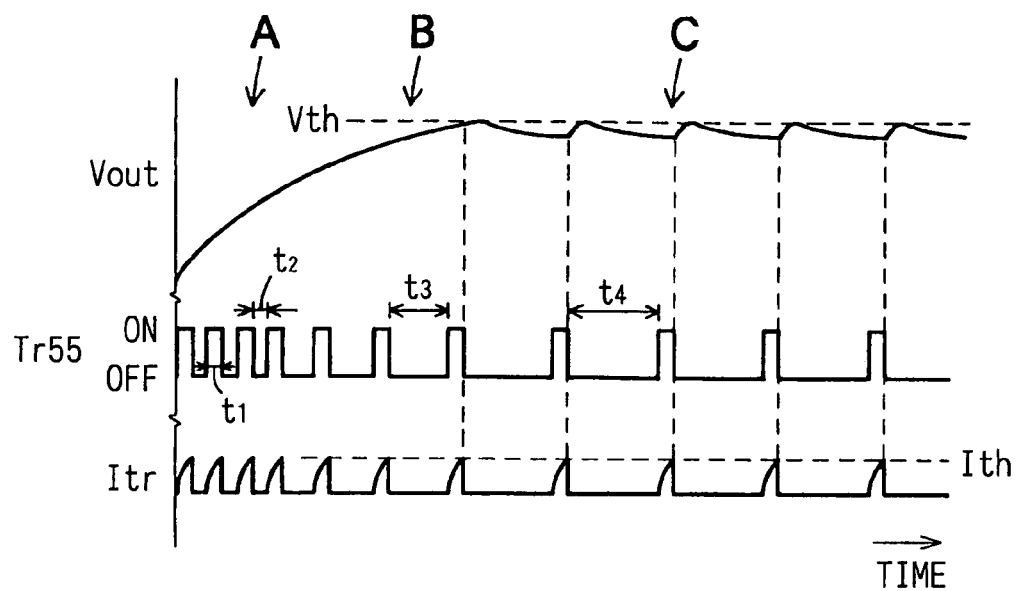
FIG. 3 is a signal diagram of an operation of the DC-DC converter circuit shown in FIG. 2.

In operation, as the output voltage Vout of the DC-DC converter circuit 20 is much lower than a limit threshold voltage Vth as shown with A in FIG. 3, the switching transistor 55 repeats turning on and off in response to the signal from the off-timer variable control circuit 35. The timer (transistor 40 and capacitor 41) in the variable control circuit 35 starts to measure the off-period of the switching transistor 55, when the switching transistor 55 turns off. The transistor 55 remains turned off until the measured period reaches a period t2. After the period t2, the switching transistor 55 turns on again.

Figure 4:
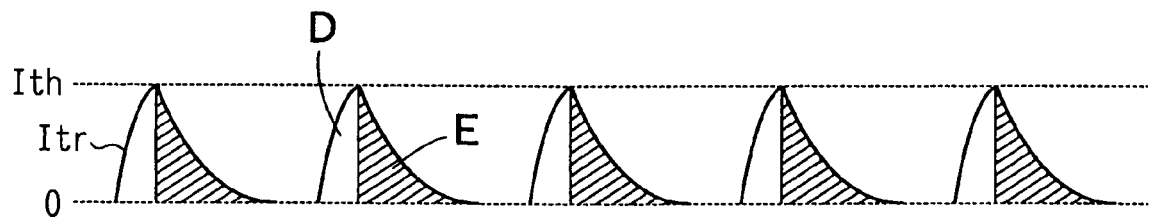
FIG. 4 is a signal diagram of a current flowing in a switching transistor in the DC-DC converter circuit.

As shown with D in FIG. 4, the transistor current Itr flowing in the switching transistor 55 increases gradually at a predetermined time constant determined by the coil 26 and the resistor 31, when the switching transistor 55 turns on. Thus, electric current Itr flows from the battery 10 in the coil 26. When the current Itr detected by the shunt resistor 31 reaches the threshold current Ith set by the reference voltage circuit 22, the current detection circuit 30 turns off the transistor 55 through the drive circuit 50.

When the switching transistor 55 turns off, the current flows from the battery 10 to the capacitor 61 in the back-up circuit 60 through the diode 27 as shown with E in FIG. 4. Thus the capacitor 61 is charged. When the capacitor 61 is fully charged, the current from the battery 10 is stored in the coil 26 to boost the voltage by the repetition of the turn-on and turn-off of the switching transistor 55.

The boosted voltage is supplied to the collision determination unit 65 and the passenger protection unit 70 from the booster circuit 20 or the back-up circuit 60 through the terminal 29. Therefore, even when the battery 10 is disconnected at the time of a vehicle collision, the units 65 and 70 are held operative with the voltage from the terminal back-up circuit 60. Thus, the DC-DC converter circuit 20 and the back-up circuit 60 forms a voltage booster circuit 15 with a back-up function.

When the output voltage supplied from the DC-DC converter circuit 20 or the like becomes too high exceeding the limit threshold voltage Vth, overheat is likely to arise. Further noise is likely to be generated under the normal condition in which the output voltage is at the limit threshold voltage. For those reasons, the off period of the switching transistor 55 is varied with the difference between the reference voltage and the output voltage Vout.

Specifically, the operational amplifier 37 produces a large voltage difference when the output voltage Vout is far lower than the limit threshold voltage Vth as shown with A in FIG. 3. The current mirror circuits 38 and 39 responsively produce a large current to charge the capacitor 41. Thus, the time period (off-period) until the capacitor 41 is discharged by the transistor 40 becomes short. This off-period t2 is set to as short as the on-period t1, for example.

As the off-period is short, the output voltage Vout is still lower than the limit threshold voltage Vth even at the end of the off-period. The comparator 43 produces a signal indicative of this detection to the NOR gate 45. The current detection circuit 30 limits the transistor current Itr to Ith. Thus, the switching transistor 55 repeats turning on and off in a short cycle period. Thus, more electric current flows from the battery 10 to the coil 26 and hence the output voltage Vout is boosted rapidly.

As the output voltage approaches the limit threshold voltage Vth as shown with B in FIG. 3, the operational amplifier 37 produces a smaller voltage difference, so that the off-period t3 of the switching transistor 55 becomes longer than t2 as shown with B in FIG. 3. As a result, the on-off cycle period of the switching transistor 55 also becomes longer.

After the output voltage Vout reaches the limit threshold voltage Vth, the comparator 37 produces only a small voltage difference, so that the off-period t4 of the switching transistor 55 becomes longer than the period t3 as shown with C in FIG. 3. Thus, the on-off cycle period of the switching transistor 55 further becomes longer.

According to the above embodiment, the noise generation arising from the repeated turning on and off of the switching transistor 55 is reduced for the following reasons.

First, the cycle period (t1+t4), of on-off control of the switching transistor 55 is lengthened to be less than that of the frequency range (several tens KHz to several hundreds KHz), in which radio noise will be generated more likely.

In addition, a recovery current that flows from the diode 27 to the switching transistor 55 after the switching transistor 55 turned off reduces generation of the radio noise. As understood from E in FIG. 4, the switching transistor 55 turns on when the forward current Idi flowing through the diode 27 is null. This is because the off-periods t3 and t4 are sufficiently long as shown with B and D in FIG. 3, that is, the on-off cycle period of the transistor 55 is sufficiently long.

According to the above embodiment, the voltage booster circuit may be designed, that is, the inductance of the coil 26 and the threshold of the switching transistor 55 may be determined, assuming that the voltage of the battery 10 is not at a minimum level but at a certain level. It is possible even in this instance to boost the battery voltage in a short period by shortening the off-period of the switching transistor 55 while the output voltage Vout is far lower than the threshold voltage Vth as shown in A in FIG. 3.

The present invention should not be limited to the above embodiment, but may be modified in many ways without departing from the spirit of the invention.

What is claimed is:

1. An apparatus comprising:
   a d.c. power source;
   a booster coil in which an electric current flows from the d.c. power source;
   a switching transistor for turning on and off a flow of the electric current in the booster coil thereby to store electric energy and boost a voltage supplied form the d.c. power source;
   a current detection circuit for detecting an electric current flowing in the switching transistor and turning off the switching transistor when the detected current reaches a predetermined level;
   an off-period control circuit for variably controlling an off-period of the switching transistor after the switching transistor is turned off; and
   a back-up circuit, connected to the booster coil, for storing the boosted voltage as an output voltage,
   wherein the off-period control circuit varies the off-period in accordance with a voltage difference between the output voltage and a predetermined reference voltage.

2. The apparatus according to claim 1, wherein the off-period control circuit increases the off-period as the voltage difference decreases.

3. The apparatus according to claim 2, wherein the predetermined reference voltage is determined based on the output voltage.

4. The apparatus according to claim 1, further comprising:
   a collision determination unit, held operable with d.c. power source and the back-up circuit, for determining a vehicle collision; and
   a passenger protection unit, held operable with the d.c. power source and the back-up circuit, for performing a passenger protection in a vehicle in response to a determination of the vehicle collision.

5. The apparatus according to claim 4, wherein the off-period control circuit substantially fixes the off-period to a constant period when the output voltage reaches a limit threshold level, so that the switching transistor turns on and off at a frequency which is lower than several tens of KHz.

6. The apparatus according to claim 5, wherein the off-period control circuit varies the off-period, when the output voltage remains lower than the limit threshold level, to a value which causes the switching transistor to turn on and off at a frequency which is higher than several tens of KHz.

7. The apparatus according to claim 1, wherein the off-period control circuit includes:
   a voltage difference detection circuit for detecting the voltage difference;
   a current mirror circuit for producing an electric current proportional to the detected voltage difference;
   a capacitor charged with the electric current of the current mirror circuit; and
   a comparator for comparing a voltage of the capacitor and a comparison reference level to determine an end of the off-period for turning on the switching transistor.

8. A voltage boosting method for boosting a d.c. power source voltage and storing the boosted voltage in a back-up circuit comprising:
   turning on a switching transistor connected in series with a d.c. power source and a booster coil to supply an electric current to the booster coil from the d.c. power source;
   detecting the electric current flowing in the switching transistor;
   turning off the switching transistor to stop a supply of the electric current to the booster coil thereby to boost the power source voltage, when the detected current reaches a predetermined current level;
   detecting the boosted voltage stored in the back-up circuit; and
   turning on the switching transistor when the detected stored voltage reaches a predetermined voltage level to repeat a sequence of the above steps,
   wherein a frequency of turning on the switching transistor is lowered as the detected stored voltage increases.

9. The voltage boosting method according to claim 8, wherein an off-period of the switching transistor is increased to lower the frequency of turning on the switching transistor, while maintaining an on-period of the switching transistor substantially unchanged.

10. The voltage boosting method according to claim 8 further comprising:
    supplying the stored voltage to a collision determination circuit and a passenger protection unit mounted in a vehicle, so that the collision determination circuit and the passenger protection unit are disconnected are held operable with the stored voltage even when the d.c. power source is disconnected.

* * * * *